United States Patent

[11] 3,603,635

[72] Inventor Allan R. Ide
 Cyprus, Calif.
[21] Appl. No. 44,367
[22] Filed June 8, 1970
[45] Patented Sept. 7, 1971
[73] Assignee Metropolitan Stevedore Company
 Wilmington, Calif.

[54] LOAD HOLDING APPARATUS
 8 Claims, 7 Drawing Figs.
[52] U.S. Cl. .................................................. 294/67 D,
 214/10.5, 294/67 EA
[51] Int. Cl. ...................................................... B66c 1/16
[50] Field of Search ........................................... 294/67 R,
 67 D, 67 DB, 67 E; 214/10.5

[56] References Cited
 UNITED STATES PATENTS
 1,966,893 7/1934 Harris ........................... 294/67
 3,332,716 7/1967 Gridley ......................... 294/67

Primary Examiner—Evon C. Blunk
Assistant Examiner—Johnny D. Cherry
Attorney—Fulwider, Patton, Rieber, Lee & Utecht ABSTRACT: Load holding apparatus including a cargo cage having a floor, the underside of which defines the support base for the cage. The cage includes a plurality of hollow vertical posts which are open on their bottom extremities and have support rods telescoped upwardly thereinto, the lower extremities thereof projecting below the floor when the cage is suspended. A holder is disposed over the cage floor and is suspended at its periphery from the upper ends of the respective support rods whereby the lower extremities of the support rods will engage a support surface onto which the cage is lowered and will be telescoped upwardly in the respective posts to raise the holder off cargo carried on the cage floor for convenient removal of such cargo and when other cargo has been loaded on the floor and the cage is raised, the rods will drop downwardly in the respective posts to lower the holder onto the top of such cargo to hold it in securely on the floor while the cage is manipulated about.

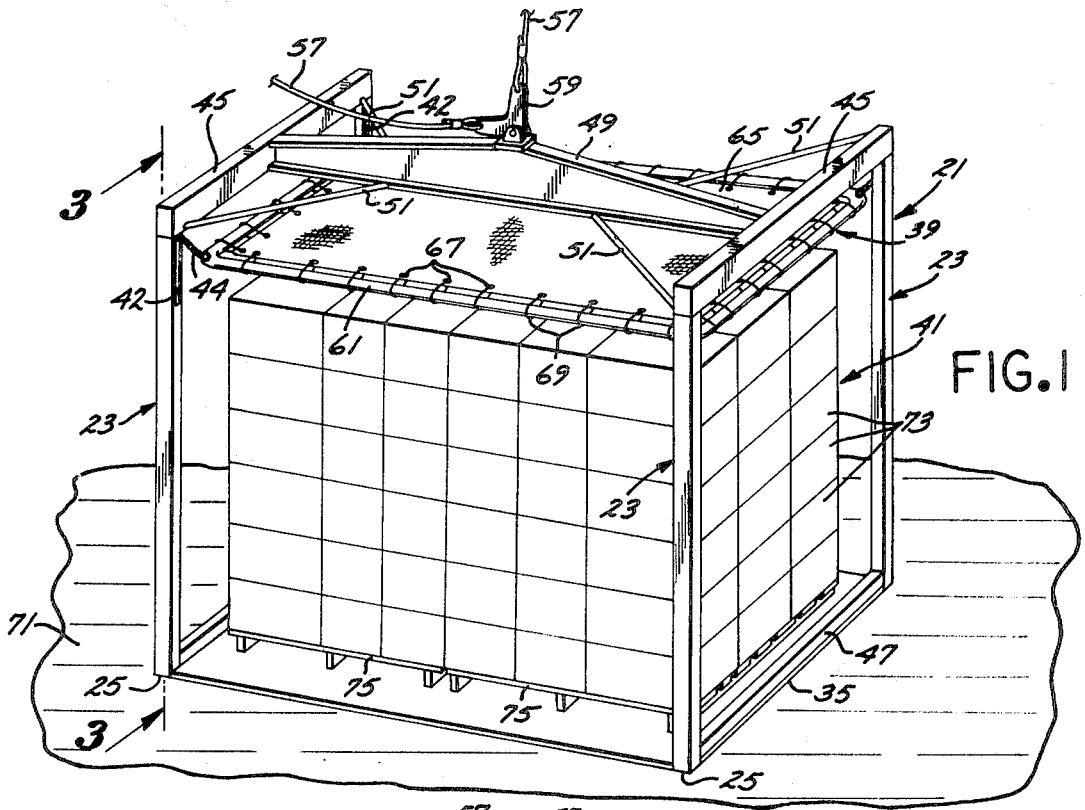
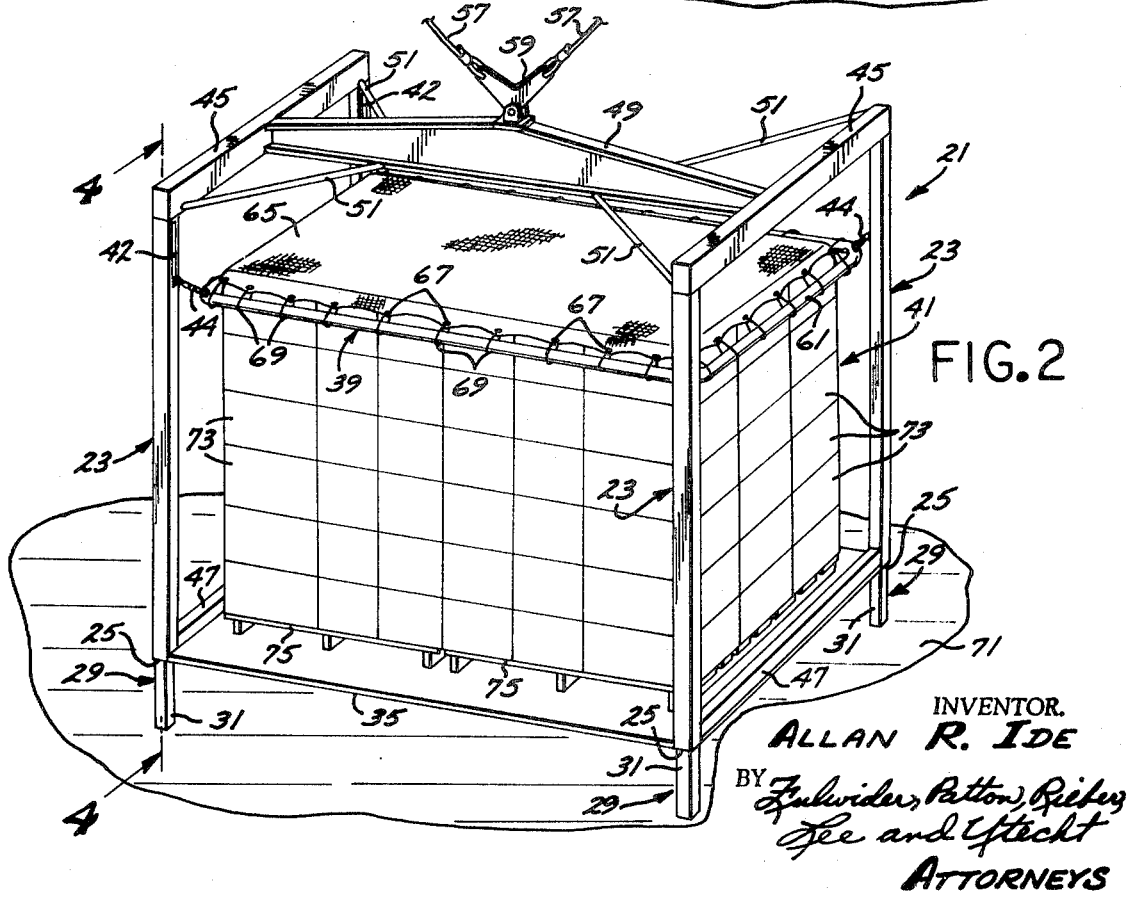

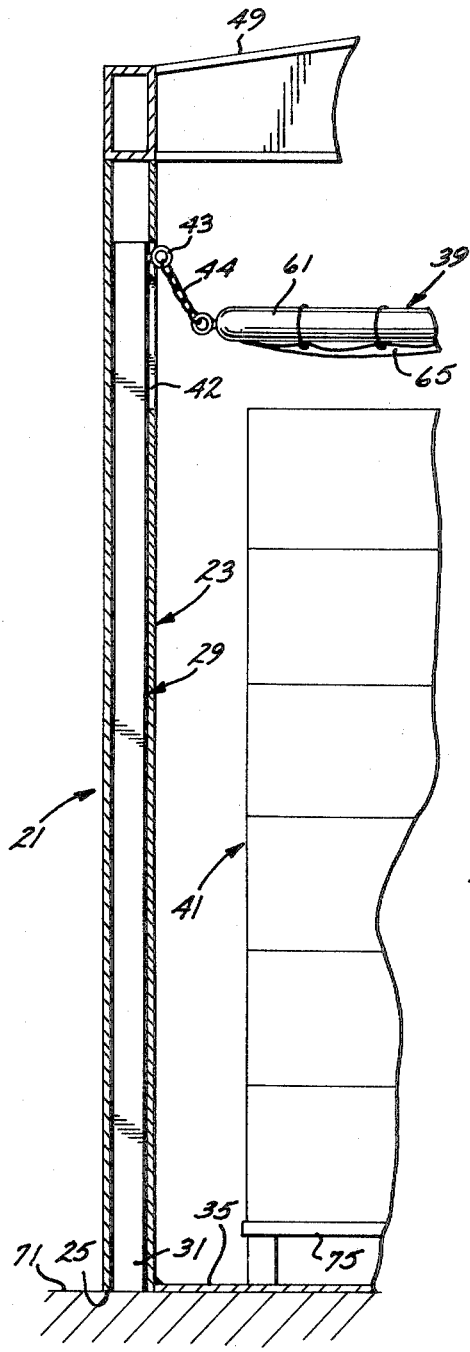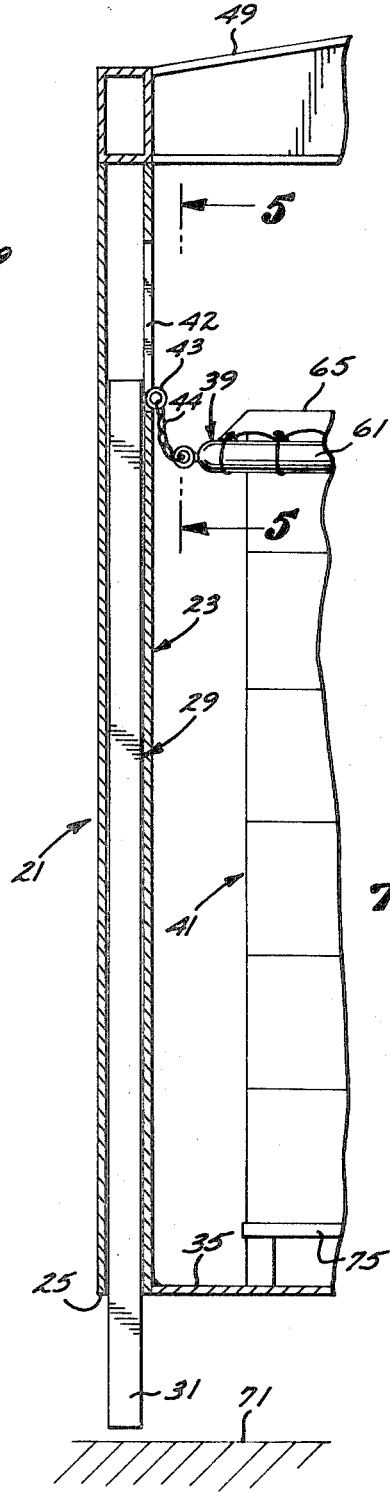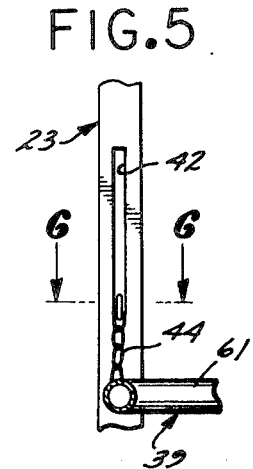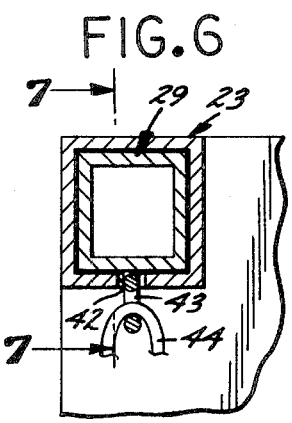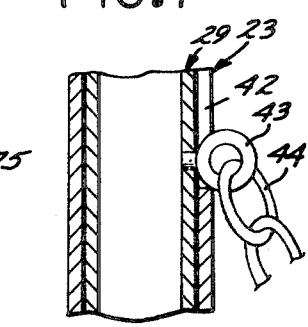

3,603,635

LOAD HOLDING APPARATUS

BACKGROUND OF THE INVENTION

1. Field of the Invention

The load holding apparatus of present invention relates to a device for holding loosely stacked cargo in a cargo cage while such cage is maneuvered about.

2. Description of the Prior Art

Load holding devices have been proposed which includes holders for holding cargo in position while the device is maneuvered about. Devices of this type are shown in U.S. Pat. Nos. 762,875, 1,834,902, 1,931,931 and 2,784,923. However, these prior art load holding devices are relatively complex in construction and many do not have means for automatically releasing the load when the device is lowered to the ground for unloading.

SUMMARY OF THE INVENTION

The load holding apparatus of present invention is characterized by a cage formed with a floor and having downwardly opening vertical hollow posts which telescopically receive respective support rods, the lower extremities of which project below the cage when it is suspended. A holder is disposed over the floor and is suspended from the upper ends of the rods whereby such holder will be automatically lowered onto cargo stacked on the floor when the cage is raised and will be automatically raised off such cargo when the cage is lowered onto a support surface.

An object of the present invention is to provide load holding apparatus of the type described which applies sufficient pressure to the stacked cargo to hold it securely in position while avoiding crushing the containers in which it is packaged.

Another object of the present invention is to provide load holding apparatus of he type described which automatically secures the cargo when the cage is lifted and automatically frees the cargo when the cage is lowered into position on the ground.

Another object of the present invention is to provide load holding apparatus of the type described which is relatively inexpensive to manufacture and will provide a long and trouble free life.

These and other objects and the advantages of the present invention will become apparent from a consideration of the following detailed description when taken in conjunction with the accompanying drawings.

DESCRIPTION OF THE DRAWINGS

FIGS. 1 and 2 are perspective views of a load holding apparatus embodying the present invention;

FIGS. 3 and 4 are partial vertical sectional views, in enlarged scale, taken along the respective lines 3—3 and 4—4 of FIGS. 1 and 2, respectively;

FIG. 5 is a vertical sectional view taken along the line 5—5 of FIG. 4;

FIG. 6 is a horizontal sectional view, in enlarged scale, taken along the line 6—6 of FIG. 5; and FIG. 7 is a vertical sectional view taken along the line 7—7 of FIG. 6.

DESCRIPTION OF THE PREFERRED EMBODIMENT

The load holding apparatus of present invention includes, generally, a cage 21 including a plurality of vertically projecting hollow posts 23 which are open on their respective bottom ends 25. Referring to FIGS. 2 and 3, support rods 29 are telescoped upwardly within the posts 23 and include lower portions 31 which project beneath the cage floor 35 when such cage is raised off the ground. A holder, generally designated 39, is disposed over the floor 35 and is suspended at its corners from the upper ends of respective rods 29 whereby when the cage 21 is raised, the rods 29 will fall downwardly within the respective posts 23 to lower the holder 39 on the stacked cargo, generally designated 41, to hold it securely on the floor 35. When the cage 21 reaches its destination and is lowered onto a dock or other support surface, as shown in FIG. 1, the lower extremities 31 of the rods 29 will engage such dock and be raised upwardly in the respective posts 23 to raise the holder 39 to the position shown in FIG. 1 to free the cargo 41 for convenient removal from such cage.

Referring to FIG. 5, the posts 23 are in the form of square tubes and the support rods 29 are formed to complementally interfit the interior cross section thereof.

Referring to FIGS. 5, 6 and 7, each of the posts 23 are formed with inwardly opening vertical slots 42 which receive the projecting ends of eyelets 43 secured at their opposite ends to each of the respective support rods 29. Connecting chains 44 are connected on one end with the eyelets 43 and on their opposite ends with eyelets 46 secured to the holder 39.

The end posts 23 are connected together on their respective upper and lower extremities by means of cross tubes 45 and 47. The upper cross tubes 45 are connected together by a centrally located hoisting beam 49. Angularly extending struts 51 anchor the outer ends of such cross members 45 to the hoisting beam 49.

A hoisting clevis 55 is affixed centrally to the hoisting beam 49 and has a pair of hoisting cables 57 connected therewith by means of a pivot member 59. The holder 39 includes a rectangular rim 61 formed from pipe. Spanning the interior of the rim 61 is a flexible net 65 that includes a plurality of eyelets 67 around its periphery for receipt of lacing 69 which secures such net to the rim 61.

In operation, when the empty cage 21 is suspended from a cargo loading crane (not shown) by means of the cables 57, the support rods 29 will be telescoped fully downwardly within the respective posts 23 and the eyelets 43 will engage the lower ends of the respective slots 42 to retain such rods within the respective posts. As the cage 21 is lowered onto a dock 71, or the like, the lower extremities 31 of the support rods 29 will engage such dock and cause such rods to move upwardly within the respective posts 23 to raise the holder 39 to its elevated position shown in FIGS. 1 and 3 for receipt of the cargo 41.

The cargo 41 is frequently in the form of a plurality of stacked cardboard boxes 73 which are loaded on pallets 75. Consequently, with the holder 39 in its elevated position, a fork truck carrying such pallets 75 may be brought into position to load such pallets 75 directly on the floor 35 of the cage 21. After the cage 21 has been loaded, such cage may be again raised by the cables 57 and the support rods 29 will drop downwardly within the respective posts 23 and move the holder 39 downwardly to the position shown in FIG. 2 with the flexible net 65 covering the top layer of boxes 73 and the rim 61 resting downwardly around the periphery thereof to hold such boxes securely in their stacked position while the cage 21 is swung into position over a ship hatchway and lowered into a hold. Again, as the cage 21 is lowered into the ship hold, the lower extremities 31 of the support posts 29 will engage the ship deck and automatically raise the holder 39 to free the cargo for removal by a forklift moving about the hold of the ship.

From the foregoing detailed description it will be apparent that the load holding apparatus of present invention provides a cage having holding means which automatically opens for receipt of cargo as the cage is placed in position on a dock whereby a forklift operator may readily load cargo on the cage without necessity of another workman opening such holding means. As the cage is raised from the dock, the holder is moved into position on the cargo to hold such cargo securely on the cage as it is swung onto a ship and lowered into the hatchway.

Various modifications and changes may be made with regard to the foregoing detailed description without departing from the spirit of the invention.

I claim:

1. Load holding apparatus comprising:

a cage including a floor and vertically projecting guide means;

a holder disposed above said floor for holding down cargo placed on said floor;

holder support means carried by said guide means for relatively free vertical movement with respect thereto and including an actuating portion formed to project below said cage when said cage is suspended form a hoist and to engage the ground as said frame is lowered thereto; and connecting means connecting said holder with said support means whereby when said cage is raised said holder will be automatically lowered onto cargo placed on said floor and when said cage is lowered to the ground, said actuating portion will engage the ground and cause said support means to be raised relative to said frame to raise said holder clear of said cargo for convenient removal from said cage.

2. Load holding apparatus as set forth in claim 1 wherein:
said cage includes a plurality of hollow vertical posts defining said guide means;

3. Load holding apparatus as set forth in claim 1 wherein:
said cage includes stop means for limiting downward movement of said holder with respect to said cage.

4. Load holding apparatus as set forth in claim 1 wherein:
said holder includes a rigid peripheral rim for surrounding said cargo and a flexible net secured at its periphery to said rim for overlying said cargo.

5. Load holding apparatus as set forth in claim 2 wherein:
said posts are formed at their respective upper extremities with said opening slots and said connecting means includes connectors projecting through said respective slots and connecting with the respective rods.

6. Load holding apparatus as set forth in claim 2 wherein:
said cage includes stop means for limiting downward movement of said holder with respect to said cage.

7. Cargo cage apparatus as set forth in claim 2 wherein:
said holder includes a rigid peripheral rim for surrounding said cargo and a flexible net secured at its periphery to said rim.

8. Cargo cage apparatus as set forth in claim 5 wherein:
said connectors include rigid portions projecting through the respective slots for engaging the lower ends thereof to limit downward movement of said posts when said cage is raised without cargo on said platform.